United States Patent
Chung et al.

(10) Patent No.: US 11,505,068 B2
(45) Date of Patent: Nov. 22, 2022

(54) IN-VEHICLE CONTROL APPARATUS USING A DETACHABLE KNOB AND METHOD FOR CONTROLLING SAME

(71) Applicants: HYUNDAI MOTOR COMPANY, Seoul (KR); KIA CORPORATION, Seoul (KR)

(72) Inventors: Jae Hoon Chung, Seoul (KR); Si Hoon Sung, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/518,171

(22) Filed: Nov. 3, 2021

(65) Prior Publication Data
US 2022/0134884 A1     May 5, 2022

(30) Foreign Application Priority Data
Nov. 5, 2020  (KR) .................. 10-2020-0146781

(51) Int. Cl.
| | |
|---|---|
| *B60K 37/06* | (2006.01) |
| *B60R 16/023* | (2006.01) |
| *G06F 3/038* | (2013.01) |
| *H04W 76/10* | (2018.01) |
| *G08C 17/02* | (2006.01) |

(Continued)

(52) U.S. Cl.
CPC .......... *B60K 37/06* (2013.01); *B60R 16/0231* (2013.01); *G06F 3/038* (2013.01); *G08C 17/02* (2013.01); *H01F 7/20* (2013.01); *H04W 76/10* (2018.02); *B60H 1/00657* (2013.01); *B60K 2370/126* (2019.05); *B60K 2370/152* (2019.05);

(Continued)

(58) Field of Classification Search
CPC .............. B60K 37/06; B60K 2370/152; B60K 2370/126; H04W 76/10; B60R 16/0231; G06F 3/038; G06F 2203/0384; G08C 17/02; H01F 7/20
See application file for complete search history.

(56) References Cited

U.S. PATENT DOCUMENTS

| | | | |
|---|---|---|---|
| 10,705,629 B1 * | 7/2020 | Arnold | ................ G06F 3/03547 |
| 11,084,379 B2 | 8/2021 | Sung et al. | |

(Continued)

FOREIGN PATENT DOCUMENTS

| | | |
|---|---|---|
| KR | 20200075157 A | 6/2020 |
| KR | 20210017243 A | 2/2021 |

*Primary Examiner* — Ariel A Balaoing
(74) *Attorney, Agent, or Firm* — Lempia Summerfield Katz LLC

(57) ABSTRACT

A vehicle function control apparatus and method control various vehicle functions. A control method of an integrated manipulation unit may include: establishing a first data path with a first detachable knob attached to a first attachment position among at least one attachment position provided in an attachment unit; transmitting information on a first function to be controlled corresponding to the first attachment position to the first detachable knob through the first data path; establishing a second data path with a second detachable knob stacked on the first detachable knob; and transmitting information on a second function to be controlled corresponding to the first attachment position to the second detachable knob through the second data path.

20 Claims, 12 Drawing Sheets

(51) Int. Cl.
*H01F 7/20* (2006.01)
*B60H 1/00* (2006.01)
*G05G 1/08* (2006.01)

(52) U.S. Cl.
CPC ....... *G05G 1/08* (2013.01); *G06F 2203/0384* (2013.01)

(56) References Cited

U.S. PATENT DOCUMENTS

| | | | |
|---|---|---|---|
| 2005/0064936 A1* | 3/2005 | Pryor | A63F 7/027 463/36 |
| 2005/0189820 A1* | 9/2005 | Blumenthal | H01H 5/02 307/104 |
| 2014/0042004 A1* | 2/2014 | Tseng | G06F 3/0362 200/336 |
| 2017/0052617 A1* | 2/2017 | Okuzumi | G06F 3/0362 |
| 2018/0002952 A1* | 1/2018 | Hollman | E05B 27/005 |
| 2018/0084937 A1* | 3/2018 | Joo | F24C 3/124 |
| 2018/0154774 A1* | 6/2018 | Park | G06F 3/017 |
| 2018/0373350 A1* | 12/2018 | Rao | B60K 35/00 |
| 2019/0391672 A1* | 12/2019 | Fischer | B60K 37/06 |
| 2020/0117288 A1* | 4/2020 | Lopez | G01P 13/04 |
| 2020/0142529 A1* | 5/2020 | Nugraha | G06F 3/044 |
| 2020/0189392 A1* | 6/2020 | Sung | H01F 7/0252 |
| 2021/0039496 A1 | 2/2021 | Sung et al. | |

* cited by examiner

200A+200B+200C 200A
200B
200C

IN-VEHICLE CONTROL APPARATUS USING A DETACHABLE KNOB AND METHOD FOR CONTROLLING SAME

This application claims the benefit of and priority to Korean Patent Application No. 10-2020-0146781, filed on Nov. 5, 2020, the entire content of which is hereby incorporated by reference as if fully set forth herein.

BACKGROUND

Field of the Disclosure

The present disclosure relates to a user interface capable of controlling various functions in a vehicle, and more particularly, to a vehicle function control apparatus using a detachable knob and a control method thereof.

Discussion of the Related Art

Recently released vehicles are equipped with various electronic equipment, so the types and ranges of functions that can be controlled by a user are also diverse. As a result, a manipulation system becomes more complicated, and an amount of information to be displayed at once is increased. Due to this trend, the size of the display that displays the operation status of a vehicle, multimedia, navigation information, and the like is also gradually increasing. In the future autonomous vehicle to be released, there may be no need for a driver to drive, so the demand for content appreciation may be increased. Accordingly, it is expected that the size of the display provided in the vehicle is going to be further increased.

In general, a central control point (CCP) based three menu structure is used to control a function to be displayed on a display. Some vehicles also provide a speech recognition function. However, the CCP-based manipulation scheme is complicated because there are many manipulation steps (depths) depending on the function to be controlled. In the case of speech recognition, the manipulation steps are relatively simple, but the frequency of use tends to be significantly reduced when there is a passenger.

Accordingly, in preparation for the trend of increasing the size of the display, there is a demand for a vehicle function control apparatus capable of using various functions of the display more intuitively.

SUMMARY

The present disclosure is to provide a vehicle function control apparatus and a control method thereof with improved convenience.

In particular, the present disclosure provides an apparatus for a vehicle and a control method thereof capable of controlling various vehicle functions using a detachable knob.

The technical objects to be achieved in the present disclosure are not limited to the technical objects mentioned above. Other technical objects not mentioned should be clearly understood from the following description by those of ordinary skill in the art to which the present disclosure belongs.

In order to solve the above technical objects, the control method of an integrated manipulation unit according to an embodiment of the present disclosure may include establishing a first data path with a first detachable knob attached to a first attachment position among at least one attachment position provided in an attachment unit. The control method may also include transmitting information on a first function to be controlled corresponding to the first attachment position to the first detachable knob through the first data path. The control method may also include establishing a second data path with a second detachable knob stacked on the first detachable knob. The control method may also include transmitting information on a second function to be controlled corresponding to the first attachment position to the second detachable knob through the second data path.

In addition, the vehicle function control apparatus according to an embodiment of the present disclosure may include a wireless communication unit, an attachment unit including at least one attachment position, and a controller. The controller may be configured to establish a first data path with a first detachable knob attached to a first attachment position among at least one attachment position provided in the attachment unit through the wireless communication unit. The controller may also be configured to transmit information on a first function to be controlled corresponding to the first attachment position to the first detachable knob through the first data path. The controller may also be configured to establish a second data path with a second detachable knob stacked on the first detachable knob. The controller may further be configured to transmit information on a second function to be controlled corresponding to the first attachment position to the second detachable knob through the second data path.

DETAILED DESCRIPTION

Figure 1:
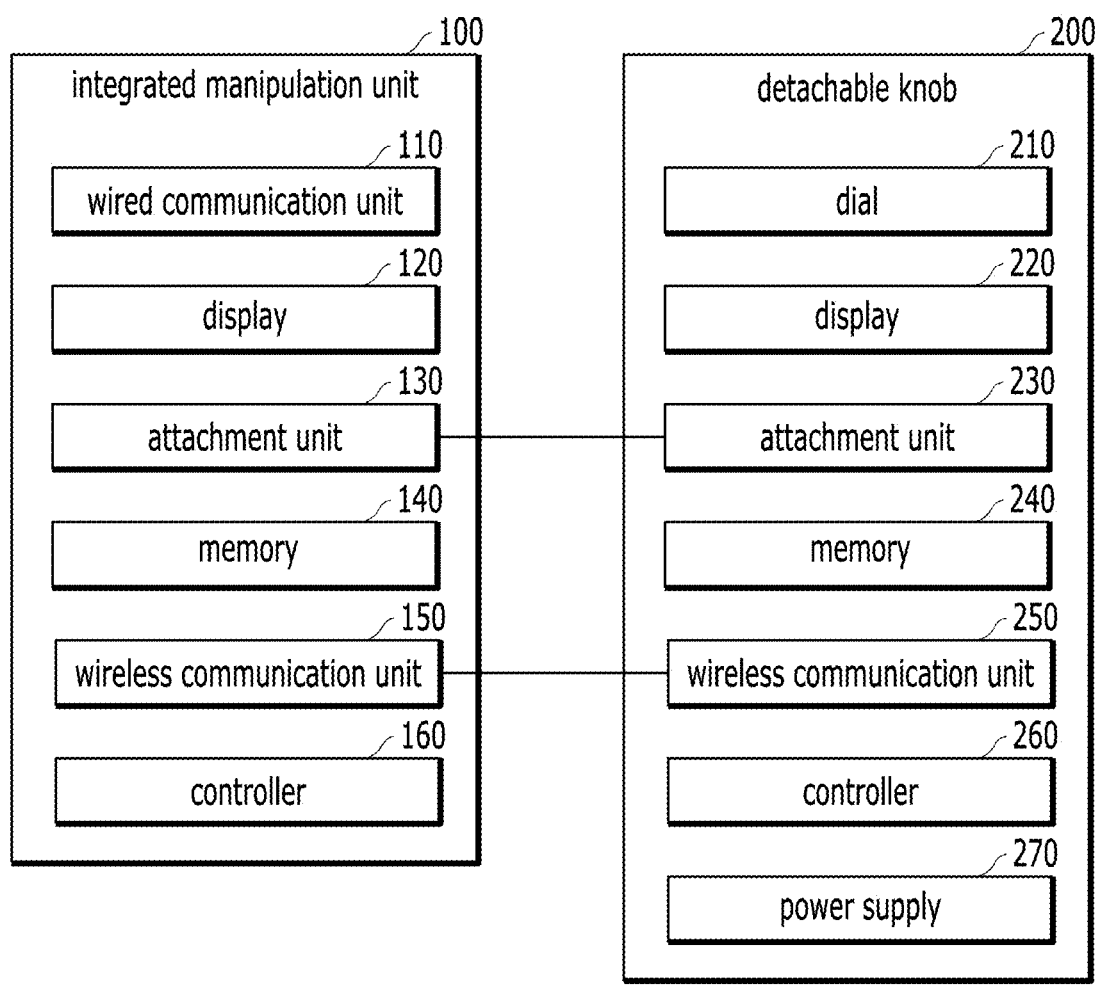
FIG. 1 shows an example of a structure of a vehicle function control system including a detachable knob according to an embodiment of the present disclosure.

Hereinafter, with reference to the accompanying drawings, embodiments of the present disclosure are described in detail so that those of ordinary skill in the art can easily carry out the present disclosure. However, the present disclosure may be implemented in several different forms and is not limited to the embodiments described herein. In order to clearly explain the present disclosure in the drawings, parts irrelevant to the description have been omitted.

Throughout the specification, when a part "includes" a certain component, it means that other components may be further included, rather than excluding other components, unless otherwise stated. In addition, parts indicated with the same reference numerals throughout the specification mean the same components. When a component, device, element, or the like of the present disclosure is described as having a purpose or performing an operation, function, or the like, the component, device, or element should be considered herein as being "configured to" meet that purpose or to perform that operation or function.

In controlling vehicle functions, one embodiment of the present disclosure includes controlling various vehicle functions with at least one detachable knob having a display that is attached to a predetermined position inside a vehicle.

First, a structure of a vehicle function control system including a detachable knob applicable to embodiments of the present disclosure is described with reference to FIG. 1. FIG. 1 shows an example of a structure of a vehicle function control system including a detachable knob according to an embodiment of the present disclosure.

Referring to FIG. 1, a vehicle function control system according to an embodiment may include an integrated manipulation unit 100 and at least one detachable knob 200.

The integrated manipulation unit 100 may include a wired communication unit 110, a display 120, an attachment unit 130, a memory 140, a wireless communication unit 150, and a controller 160. Hereinafter, each component is described in detail.

The wired communication unit 110 may exchange data with a controller that may be in charge of one or a plurality of functions to be controlled in a vehicle. For example, the wired communication unit 110 may support at least one of vehicle communication schemes such as CAN, CAN-FD, LIN, Ethernet, or the like. As another example, the wired communication unit 110 may receive operation state information from, for example, an air conditioning control device for controlling an air conditioning function, a body control device in charge of convenience functions such as a seat, an Audio/Video/Navigation (AVN) system, or the like. The wired communication unit 110 may transmit a control command.

The display 120 serves to visually output various information necessary for the operation state of the vehicle or various information required by a driver, such as a navigation guide screen, operation state information of an air conditioning system, and reproduction state information of a multimedia function. When configured as a touchscreen, the display 120 may display a virtual knob for controlling at least some functions and sense a touch command input through the virtual knob.

The attachment unit 130 may sense whether the detachable knob 200 to be described below is attached or detached. For example, the attachment unit 130 may include at least one of a hall sensor for detecting magnetic force, a near-field communication (NFC) transceiver for performing NFC communication, a wireless charging transmitter for sensing a wireless charging receiver, a light receiver for recognizing a specific light emission pattern, or a capacitive sensor for sensing a change in capacitance. In other words, when the detachable knob 200 is provided with a permanent magnet, the detachable knob 200 may be sensed by the Hall sensor. When the detachable knob 200 is equipped with an NFC tag, the detachable knob 200 may be sensed by the NFC transceiver. When a wireless charging receiver is provided in the detachable knob 200, the detachable knob 200 may be sensed through the wireless charging transmitter. It should be understood that these sensing means are examples and the embodiment is not necessarily limited thereto. In addition, the attachment unit 130 may include an attachment means for fixing the detachable knob 200 to one or more predetermined attachment positions. For example, the attachment means may include a plurality of permanent magnets or electromagnets disposed to have a predetermined pattern. In this case, at least a permanent magnet is provided in the detachable knob 200 to correspond to the configuration of the attachment unit 130, which is described below.

According to an embodiment, at least one of the display 120 or the attachment unit 130 may be disposed at a different location within the vehicle. At least one of the display 120 or the attachment unit 130 may be spaced apart from the other components constituting the integrated manipulation unit 100.

The memory 140 may store an operating system for driving the integrated manipulation unit 100, various application programs operating on the operating system, multimedia contents, input/output control information, and the like.

The wireless communication unit 150 is connected to the wireless communication unit 250 of the detachable knob 200 at least using a short-range communication protocol (e.g., Bluetooth, Wi-Fi, Zigbee, NFC, etc.) or 3/4/5G protocol, etc. to perform data exchange. It should be understood that depending on the implementation, the wireless communication unit 150 may communicate with other sensors or controllers in the vehicle.

The controller 160 may perform overall control of each component described above. The controller 160 may also perform determination and calculation necessary to control the function to be controlled through interlocking with the detachable knob 200 according to embodiments of the present disclosure to be described below.

On the other hand, the detachable knob 200 may include a dial (or a wheel) 210, a display 220, an attachment unit 230, a memory 240, a wireless communication unit 250, a controller 260, and a power supply 270.

The dial 210 may include a wheel encoder (not shown) for sensing a rotation state. The display 220 may be disposed on the upper surface of the detachable knob 200, and the shape of the display 220 may be circular to correspond to the upper surface shape of the detachable knob 200, but the present disclosure is not necessarily limited thereto.

The attachment unit 230 may include an attachment means corresponding to the configuration of the attachment unit 130 of the integrated manipulation unit 100. An example of such an attachment means may include a plurality of magnetic materials (e.g., 231 in FIGS. 8 and 12) disposed on the bottom surface (outer bottom surface or inner bottom surface) of the detachable knob 200 to have a predetermined pattern. An individual magnetic material may be made of iron, nickel, cobalt, a magnet, or an alloy material thereof, but the present disclosure is not necessarily limited thereto. According to an embodiment, the magnetic material may be replaced with an electromagnet, and a combination of a permanent magnet and an electromagnet is also possible.

The memory 240 may store an operating system for driving the detachable knob 200, identification information for each function to be controlled, input/output control information of the detachable knob 200, and the like.

The wireless communication unit 250 is connected to at least the wireless communication unit 150 of the integrated manipulation unit 100 using a short-range communication protocol (e.g., Bluetooth, Wi-Fi, Zigbee, NFC, etc.) or a 3/4/5G protocol, and the like to perform data exchange. If a plurality of detachable knobs 200 is used together, the wireless communication unit 250 may determine whether or not there is another detachable knob attached in a stacked manner and perform data exchange with the other detachable knob when it is determined there is stacking. In this case, the wireless communication unit 250 may be connected to the wireless communication unit of the other detachable knob through the wireless communication unit 150 of the integrated manipulation unit 100 and different communication protocol. For example, the wireless communication unit 250 may be connected to the wireless communication unit 150 of the integrated manipulation unit 100 through Bluetooth and may communicate with the wireless communication unit of the other detachable knob through NFC. However, the embodiment is not necessarily limited thereto.

The controller 260 performs overall control of each of the remaining components. The controller 260 also performs determination and calculation required to control a function to be controlled through interworking with the integrated manipulation unit 100 according to embodiments of the present disclosure that are described below.

The power supply 270 may include a rechargeable battery and may supply power to the remaining components of the detachable knob 200. In addition, the power supply 270 is provided with a wireless charging receiver coil and may charge the rechargeable battery through a wireless charging transmission coil when the wireless charging transmission coil is located in the attachment unit 130 of the integrated manipulation unit 100.

Figure 2:
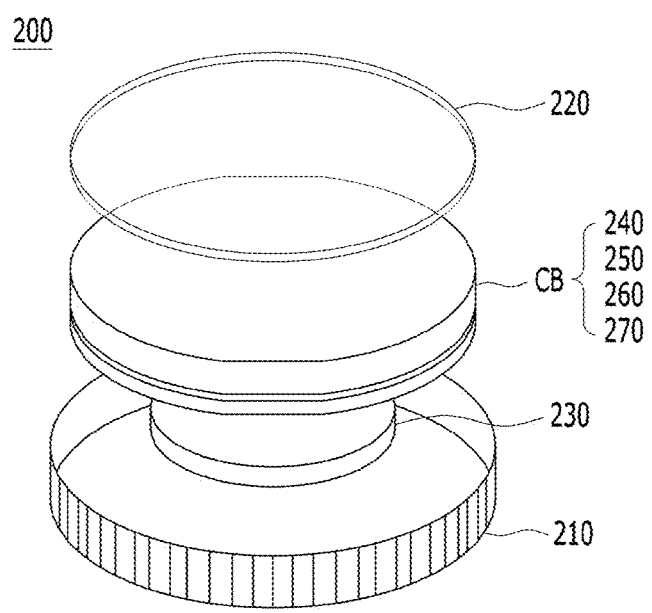
FIG. 2 is a view for explaining a structure of a detachable knob according to an embodiment of the present disclosure.

FIG. 2 is a view for explaining a structure of a detachable knob according to an embodiment of the present disclosure.

Referring to FIG. 2, the detachable knob 200 according to an embodiment may have a disk-shaped appearance. Specifically, the detachable knob 200 may be in a form in which a toroidal or ring-shaped dial 210 surrounds sides thereof.

The dial 210 may be configured to rotate clockwise or counterclockwise along the outer circumferential direction of the detachable knob 200 and may include a wheel encoder that can sense at least the rotation direction and degree of rotation (e.g., displacement or angle) when a user rotates the dial while holding the dial. It is apparent that this is for illustrative purposes and the present disclosure is not limited to specific means or methods for sensing the rotation.

The display 220 may be disposed on the upper surface of the detachable knob 200.

A substrate circuit board (CB) may be disposed under the display 220. The memory 240, the wireless communication unit 250, the controller 260, the power supply 270, and the like may be disposed on the substrate CB.

In addition, the attachment unit 230 may be disposed under the substrate CB.

Meanwhile, the detachable knob 200 may further include a housing (not shown) surrounding at least a portion of the display 220, the substrate CB, and the attachment unit 230.

Figure 3:
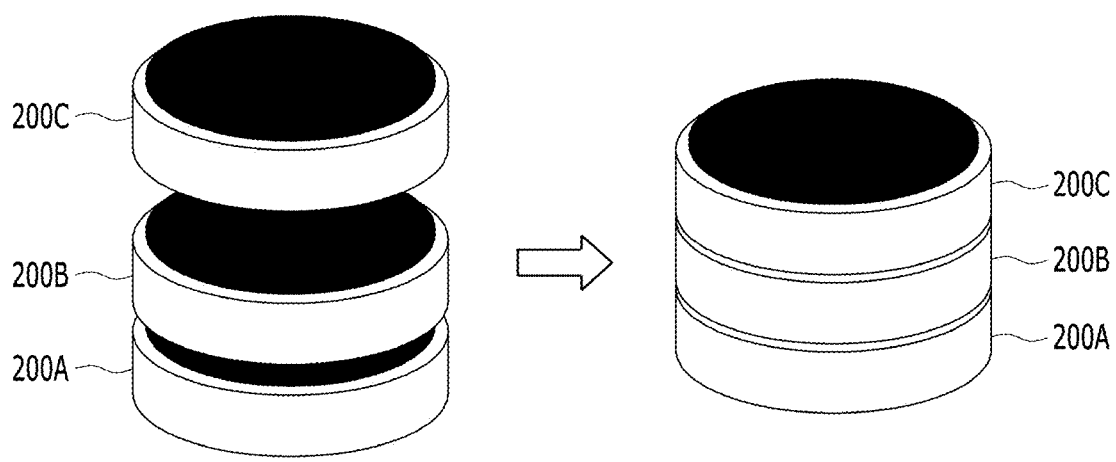
FIG. 3 is a view for explaining a stacking method of a detachable knob according to an embodiment of the present disclosure.

FIG. 3 is a view for explaining a stacking method of a detachable knob according to an embodiment of the present disclosure.

As shown on the left side of FIG. 3, when a plurality of detachable knobs 200A, 200B, and 200C is provided, they may be stacked so as to overlap with each other in a vertical direction as shown on the right side of FIG. 3.

When stacked so as to overlap, each of the detachable knobs 200A, 200B, and 200C may be fixed with other vertically adjacent detachable knobs through its attachment unit 230 and may exchange data through the wireless communication unit 250. For example, when a permanent magnet or an electromagnet is disposed in the attachment unit 230, the vertically adjacent detachable knobs 200A, 200B, and 200C may maintain a coupled state with each other through magnetic force. In addition, each of the vertically adjacent detachable knobs 200A, 200B, and 200C may determine the contact state by reading the tag of the detachable knob positioned at its lower part in an NFC method and obtain identification information. As another example, each of the vertically adjacent detachable knobs 200A, 200B, and 200C may determine the distance and position (upper and lower, etc.) with other adjacent detachable knob through a Bluetooth Low Energy (BLE) method.

According to an embodiment, a permanent magnet or an electromagnet is disposed on the rear surface of the display 220 separately from the attachment unit 230 for more stable fixing during stacking. Thus, a strong magnetic coupling with the attachment unit of another detachable knob disposed on the upper surface can be achieved.

Figure 4:
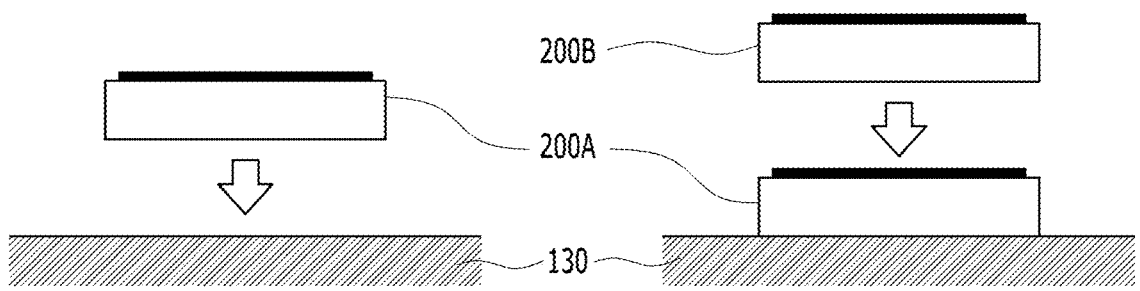
FIG. 4 is a view for explaining an attachment method of a detachable knob according to an embodiment of the present disclosure.

FIG. 4 is a view for explaining an attachment method of a detachable knob according to an embodiment of the present disclosure.

As shown on the left side of FIG. 4, one detachable knob 200A may be first attached to the attachment unit 130 of the integrated manipulation unit 100, and then another detachable knob 200B may be attached onto the first attached detachable knob 200A. Alternatively, as shown on the right side of FIG. 3, a plurality of knobs may be first stacked, and the stacked plurality of knobs may be attached onto the attachment unit 130 of the integrated manipulation unit 100 at a time.

Figure 5:
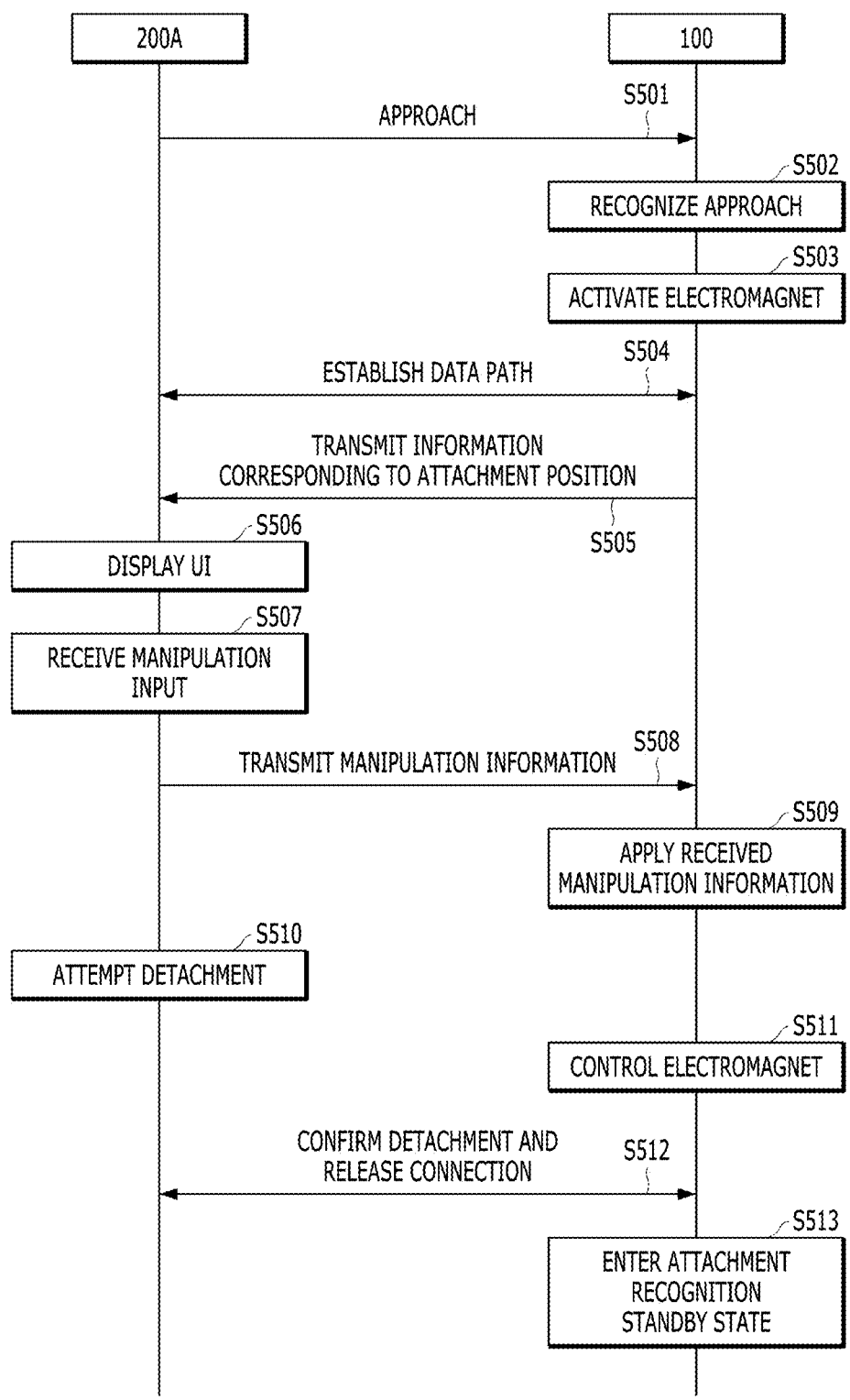
FIG. 5 is a flowchart illustrating an example of an operation process of a vehicle function control system including a detachable knob according to an embodiment of the present disclosure.

FIG. 5 is a flowchart illustrating an example of an operation process of a vehicle function control system including a detachable knob according to an embodiment of the present disclosure.

In FIG. 5, the integrated manipulation unit 100 may monitor in a state of attachment recognition standby whether a detachable knob 200 is attached. The state of attachment recognition standby may be activated when the detachable knob 200A is attached to and then detached from an arbitrary attachment area, activated in a specific power state (e.g., accessory or ACC), or activated when a smart key is sensed in a vehicle. However, the embodiment is not necessarily limited thereto. In addition, in this state, the application of power to the electromagnet of the attachment unit 130 may be started, and other sensing means, for example, a touch controller, an NFC module, etc. may be activated.

As the detachable knob 200A approaches at least one of the attachment positions disposed on the attachment unit 130 (S501), the integrated manipulation unit 100 recognizes the approach of the detachable knob 200A through the attachment unit 130 (S502) and the electromagnet disposed at the recognized attachment position (site) may be activated (S503). Accordingly, the detachable knob 200A may be fixed to the attachment position on the attachment unit 130.

In addition, the integrated manipulation unit 100 may establish a data path with the detachable knob 200A through the wireless communication unit 150 (S504). For example, the integrated manipulation unit 100 reads the tag of the detachable knob 200A through the NFC reader and may attempt wireless connection with the detachable knob 200A using the wireless connection information (e.g., Bluetooth ID, connection password, etc.) included in the tag.

As the data path is established, the integrated manipulation unit 100 may transmit, through the established data path, information on the function to be controlled corresponding to the attachment position to which the detachable knob 200A is attached (S505). In this case, the transmitted information may be a function code, a current function value, and the like. For example, when the function to be controlled corresponding to the attachment position is a target temperature control function of an air conditioner, the function code corresponding to the temperature control and a currently set target temperature value (e.g., 24 degrees) may be transmitted.

Accordingly, the detachable knob 200A may display a user interface capable of displaying numbers on the display 220 so as to correspond to the currently set function code (506). For example, the currently set target temperature may be displayed as a number on the display 220.

Thereafter, when a manipulation input is received (S507), such as the dial 210 being manipulated, the detachable knob 200A may transmit the manipulation information to the integrated manipulation unit 100 through the established data path (S508). For example, when a manipulation input is received in a form of rotation of the dial 210, the manipulation information may include information on the rotation direction and the rotation amount of the dial 210 (+ direction & 2 steps, etc.).

The integrated manipulation unit 100 may reflect the received manipulation information to the corresponding function (S509). For example, when the attachment position of the detachable knob 200A is the temperature control of the air conditioner and the manipulation information corresponds to +2 steps, the integrated manipulation unit 100 may control the target temperature of the air conditioner to increase by 2 degrees.

If there is an attempt to separate the detachable knob, such as applying a force by a vehicle occupant to lift the detachable knob 200A from the attachment position (S510), the integrated manipulation unit 100 may recognize this with a change in the magnetic force of the electromagnet disposed in the attachment portion 130, and the like. The integrated manipulation unit 100 may then perform the control of the electromagnet, such as weakening the magnetic force of the electromagnet for easy detachment (S511).

Afterwards, the integrated manipulation unit 100 releases the wireless connection with the detachable knob 200A when the detachable knob 200A is no longer sensed in the attachment unit 130 (S512) and may enter the attachment standby state again (S513).

Next, an operation process of a case in which one detachable knob 200A is already disposed and another detachable knob 200B is stacked is described with reference to FIG. 6 as shown on the right side of FIG. 4.

Figure 6:
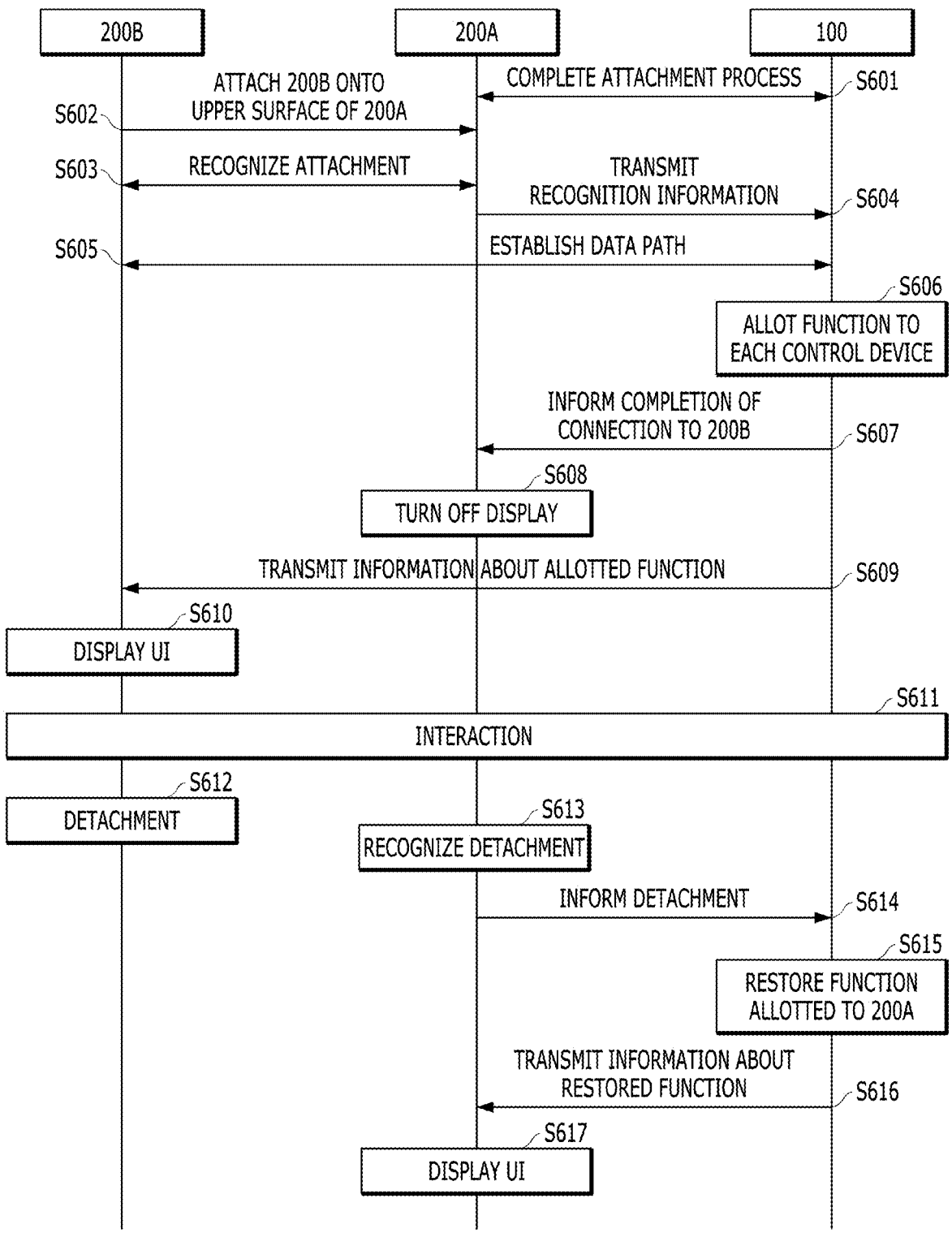
FIG. 6 is a flowchart illustrating an example of an operation process in stacking detachable knobs of a vehicle function control system according to an embodiment of the present disclosure.

FIG. 6 is a flowchart illustrating an example of an operation process in stacking a detachable knob of a vehicle function control system according to an embodiment of the present disclosure.

Referring to FIG. 6, the attachment process of one detachable knob 200A corresponding to steps S501 to S506 of FIG. 5 may be completed (S601).

Thereafter, another detachable knob 200B may be attached to the upper surface of the detachable knob 200A attached first (S602).

Accordingly, the two detachable knobs 200A and 200B can recognize the attachment state (S603). For example, the lower detachable knob 200A reads the NFC tag of the upper detachable knob 200B to determine whether or not to attach and to obtain recognition information of the upper detachable knob 200B. However, the embodiment is not necessarily limited thereto. In this case, the recognition information may include unique identification information of the upper detachable knob 200B, wireless connection information, and the like.

The lower detachable knob 200A transmits the recognition information to the integrated manipulation unit 100 (S604). The integrated manipulation unit 100 may establish a data path using the acquired recognition information for the upper detachable knob 200B (S605). To this end, the communication unit 150 of the integrated manipulation unit 100 may be configured to enable simultaneous communication with a plurality of detachable knobs 200A and 200B (e.g., multi-channel communication or a plurality of Bluetooth (BT) modules, etc.).

As the data path is established, the integrated manipulation unit 100 may differently allocate a function to be controlled for the same attachment position for each knob (S606). For example, when a function to be controlled corresponding to the attachment position is an air conditioning function, the integrated manipulation unit 100 may assign an air volume to the lower detachable knob 200A and assign a target temperature to the upper detachable knob 200B.

It should be apparent that if the function to be controlled for the corresponding attachment position is fixed to one, the same function to be controlled may be assigned to both knobs 200A and 200B, or the function to be controlled may be assigned only to either one (e.g., the upper detachable knob 200B).

Afterwards, the integrated manipulation unit 100 may notify the lower detachable knob 200A that the connection with the upper detachable knob 200B is completed (S607). Accordingly, the lower detachable knob 200A may turn off the display 220A (S608). This is to prevent unnecessary power consumption because the display 220A of the lower detachable knob 200A is hindered by the upper detachable knob 200B due to the stacking.

In addition, the integrated manipulation unit 100 transmits assigned function information through the established data path to the upper detachable knob 200B (S609). The upper detachable knob 200B may output a user interface to the display 220B in response to the assigned function information (S610). Since steps S609 and S610 correspond to steps S505 and S506 of FIG. 5, respectively, redundant descriptions have been omitted.

Specific forms of steps S608 to S610 are described with reference to FIG. 7.

Figure 7:
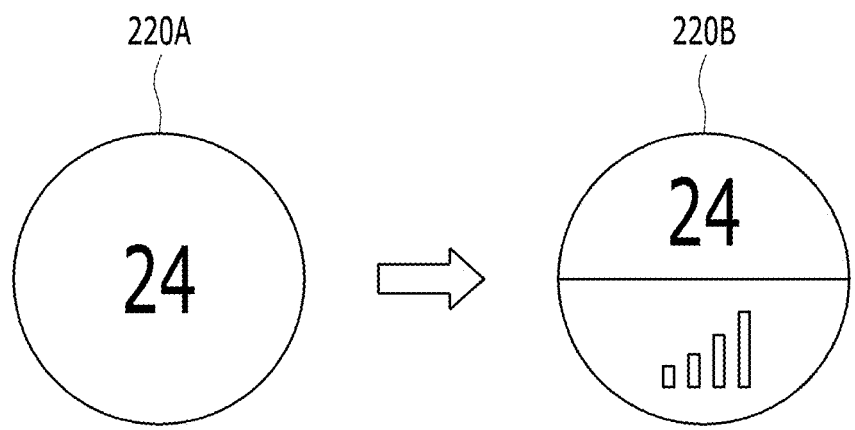
FIG. 7 is a view for explaining an example of a change in a user interface in stacking of detachable knobs according to an embodiment of the present disclosure.

FIG. 7 is a view for explaining a change in a user interface in stacking a detachable knob according to an embodiment of the present disclosure.

Referring to the left side of FIG. 7, before the upper detachable knob 200B is attached, target temperature information of the air conditioner may be displayed on the display 220A of the lower detachable knob 200A. In this case, when the upper detachable knob 200B is attached, the display 220A of the lower detachable knob 200A is turned off and the user interface (UI) according to the assigned function may be displayed through the display 220B of the detachable knob 200B (S606). For example, the target temperature assigned to the upper detachable knob 200B is displayed at the upper part of the display 220B of the upper detachable knob 200B as shown on the right side of FIG. 7. Also, the air volume assigned to the lower detachable knob 200A is displayed at the lower part.

Through these functions, a vehicle occupant can expand the types of function to be controlled that is desired to be controlled.

Returning to FIG. 6 again, a user can operate at least one of the upper detachable knob 200B or the lower detachable knob 200A. The corresponding manipulation information is transmitted to the integrated manipulation unit 100 so that interaction may be occurred, such as the manipulation information being reflected to a corresponding function to be controlled (S611). This process corresponds to steps S507 to S509 of FIG. 5, and thus a redundant description has been omitted.

On the other hand, when the upper detachable knob 200B is detached (S612), the lower detachable knob 200A can recognize that the upper detachable knob 200B is detached through the occurrence of an NFC unrecognized situation, and the like (S613). Accordingly, the lower detachable knob 200A transfers a detaching notification to the integrated manipulation unit 100 (S614). If there is a change in the function assignment of the detachable knob 200A in step S606, the integrated manipulation unit 100 restores assigned function (S615) and again transfers the assigned function information to the lower detachable knob 200A. Accordingly, the detachable knob 200A may display the user interface by activating the display 220A again (S617).

It should be apparent that the integrated manipulation unit 100 may release the wireless connection with the detached detachable knob 200B according to the detaching notification.

In the embodiment shown in FIG. 6, it has been described that each of the detachable knobs 200A and 200B and the integrated manipulation unit 100 establish a separate wireless connection, but the embodiment is not limited thereto. For example, the integrated manipulation unit 100 may establish a wireless communication connection only with the detachable knob 200A connected first. The data exchange between the remaining detachable knob 200B and the integrated manipulation unit 100 may be carried in the form of relaying by the detachable knob 200A connected first.

On the other hand, as shown in the right side of FIG. 3, when a plurality of detachable knobs in a pre-stacked state is attached to the attachment unit 130 of the integrated manipulation unit 100, the lowermost detachable knob 200A may secure recognition information of the remaining pre-stacked detachable knobs 200B and 200C and transmit the secured recognition information to the integrated manipulation unit 100.

If another detachable knob 200C, etc. is stacked after proceeding to step S610 or step S611 of FIG. 6, the process corresponding to step S603 may be performed between the middle detachable knob 200B and the uppermost detachable knob 200C. Thereafter, the middle detachable knob 200B may transmit recognition information on the uppermost detachable knob 200C to the integrated manipulation unit 100 through the established data path. The data path between the uppermost detachable knob 200C and the integrated manipulation unit 100 may be established.

On the other hand, in the stacked state, power may be shared between the detachable knobs through a wireless charging method and two or more detachable knobs may be simultaneously charged through the integrated manipulation unit 100.

Hereinafter, with reference to FIGS. 8A-9B, function assignment and changes in user interface according to the stacking of the detachable knob are described.

Figure 8A:
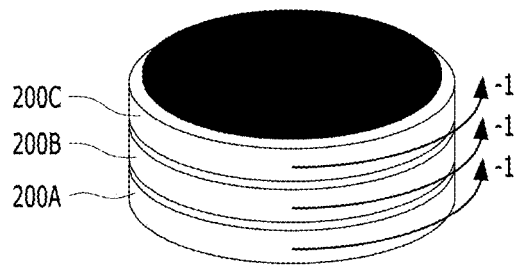
FIGS. 8A, 8B, and 8C are views for explaining an example of a function assignment form by stacking detachable knobs according to an embodiment of the present disclosure.
Figure 8B:
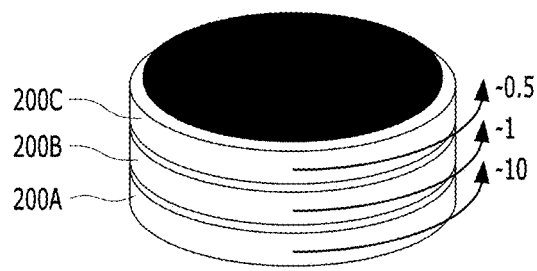
Figure 8C:
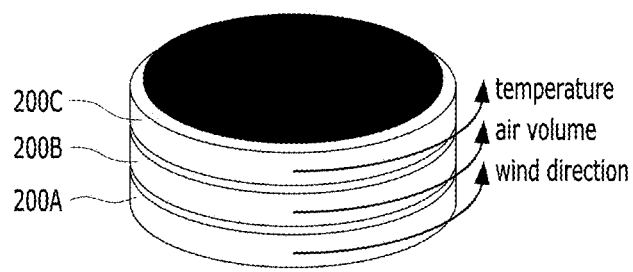

FIGS. 8A, 8B, and 8C are views for explaining an example of a function assignment form by stacking detachable knobs according to an embodiment of the present disclosure. In FIGS. 8A, 8B, and 8C, it is assumed that three detachable knobs 200A, 200B, and 200C are stacked on the attachment unit 130 of the integrated manipulation unit 100.

First, referring to FIG. 8A, even if the detachable knobs 200A, 200B, and 200C are stacked, the same function to be controlled is assigned to each detachable knob. The manipulation amount compared to the rotation amount of the dial 210 may be set to the same for each layer.

On the other hand, referring to FIG. 8B, the function to be controlled assigned to each of the stacked detachable knobs 200A, 200B, and 200C is the same, but the manipulation amount compared to the unit rotation amount of the dial 210 may be set different for each layer. For example, when the function to be controlled assigned to each of the stacked detachable knobs 200A, 200B, and 200C is the target temperature control of an air conditioner, the temperature change per predetermined rotation angle of the dial 210 is 0.5 degrees in the case of the uppermost detachable knob 200C, 1 degree in the case of the middle detachable knob 200B, and 10 degrees in the case of the lowermost detachable knob 200A. In this case, the number of manipulations required to reach the target temperature desired by a user may be reduced, and fine adjustment may be convenient.

Referring to FIG. 8C, similarly to the right diagram of FIG. 7, different functions to be controlled may be assigned to each stacking position, or different sub-functions for one function to be controlled may be assigned.

Figure 9A:
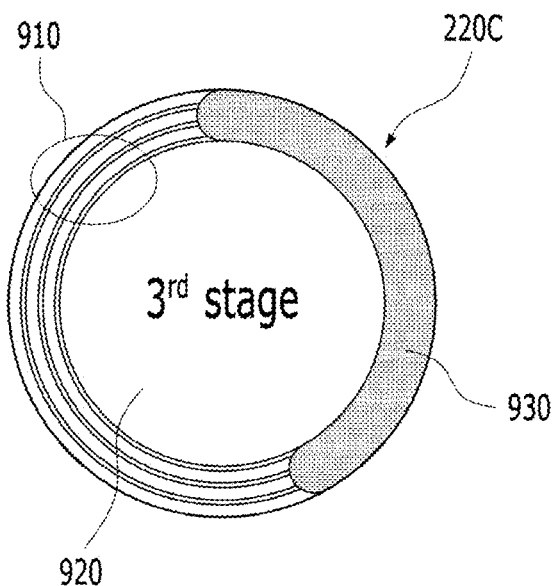
FIGS. 9A and 9B are views for explaining another example of a change in a user interface in stacking detachable knobs according to an embodiment of the present disclosure.
Figure 9B:
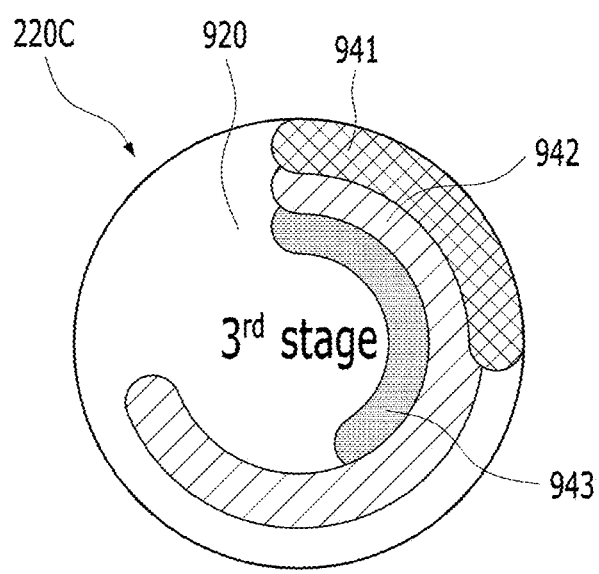

FIGS. 9A and 9B are views for explaining another example of a change in a user interface in stacking of detachable knobs according to an embodiment of the present disclosure. In FIGS. 9A and 9B, it is assumed that three detachable knobs 200A, 200B, and 200C are stacked on the attachment unit 130 of the integrated manipulation unit 100.

Referring to FIG. 9A, in a case in which the same function to be controlled is assigned to each of the three detachable knobs 200A, 200B, and 200C, a graphic user interface is displayed through the display 220C of the uppermost detachable knob 200C. In the graphic user interface, a ring-shaped indicator 910 indicating the current number of stackings may be displayed on the edge of the display 220C, and the number of stacks 920 may be displayed as a text on the center. Also, a gauge 930 indicating a current control value of the function to be controlled may be displayed on the edge of the display 220C.

Referring to FIG. 9B, in a case in which different functions to be controlled are assigned to each of the three detachable knobs 200A, 200B, and 200C, the graphic user interface through the display 220C of the uppermost detachable knob 200C is displayed. In the graphic user interface, the text 920 indicating the current number of stackings may be displayed in the center. The gauge 930 indicating current control values of different functions to be controlled may be displayed on the edge of the display 220C with gauges 941, 942, and 943 in a concentric circle shape.

Through the user interface as described above, a user can intuitively recognize the number of stackings of the detachable knobs and the current control value. It should be apparent that in the above-described embodiment, the specific configuration form of the user interface or the arrangement position of the components is illustrative and the embodiment is not necessarily limited thereto.

Figure 10A:
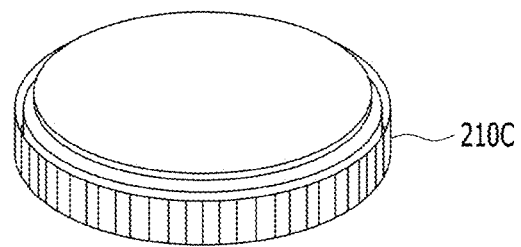
FIGS. 10A, 10B, and 10C show examples of a detaching process of a detachable knob according to an embodiment of the present disclosure.
Figure 10B:
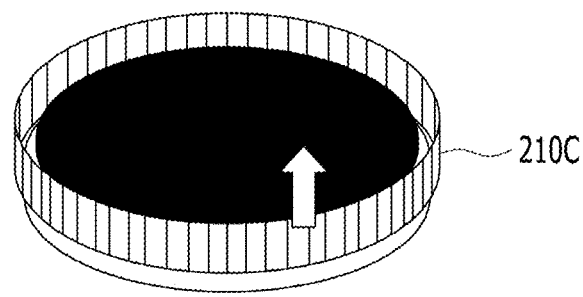
Figure 10C:
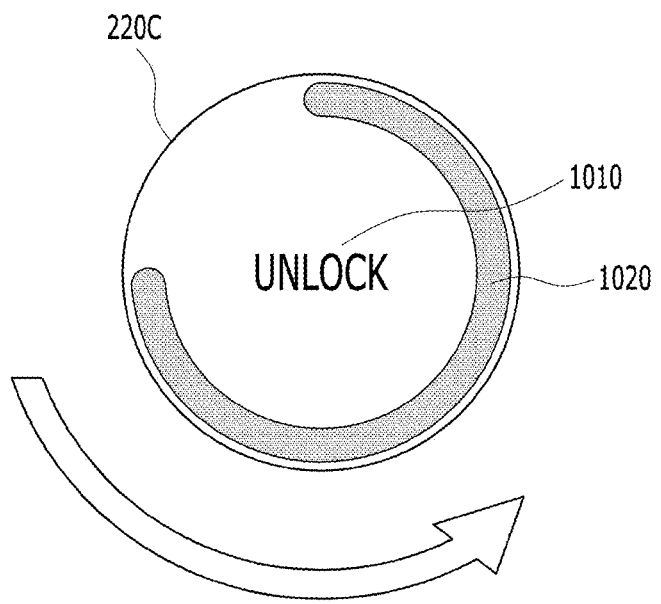

FIGS. 10A, 10B, and 10C show an example of a detaching process of a detachable knob according to an embodiment of the present disclosure. In FIGS. 10A, 10B, and 10C, it is assumed that the dial 210C may be moved upwards by a predetermined range. Whether or not the dial 210C is moved may be sensed through a sensor (not shown) provided in the detachable knob 200C.

When the detachable knob 200C is to be detached from the upper portion of another detachable knob or from the attachment unit 130 of the integrated manipulation unit 100, a user may lift the dial 210C upward within a movable range of the dial 210C as shown in FIG. 10B in the state as in FIG. 10A.

When the vertical movement state of the dial 210C is sensed, the controller 260 of the detachable knob 200C recognizes this as the user's intention to detach. The controller 260 may weaken magnetic force when the attachment unit 230 is implemented as an electromagnet. Alternatively, the controller 260 may request to weaken the electromagnet of the attachment unit 130 for the integrated manipulation unit 100 through the wireless communication unit 250 (i.e., to transmit information corresponding to the detachment intention). Accordingly, a user can easily detach the detachable knob 200C.

In this case, the controller 260 of the detachable knob 200C may perform the electromagnet control only when the state in which the dial 210C is moved upwards continues for a certain period of time or more. In another embodiment, the controller 260 of the detachable knob 200C may control the electromagnet to be weaken in proportion to the period of time during which the dial 210C is moved upwards and continues to be moved upwards.

The magnetic force control process of the electromagnet may be recognized by a user through visual information. For example, when the dial 210C is moved upwards, a text 1010 indicating that the detaching is in progress and a gauge 1020 indicating the progress degree may be displayed on the display 220C as shown in FIG. 10C. As the gauge 1020 gradually disappears in the counterclockwise direction, the magnetic force of the electromagnet may be weakened or the magnetic force application of the electromagnet may be released when the gauge 1020 disappears.

Figure 11A:
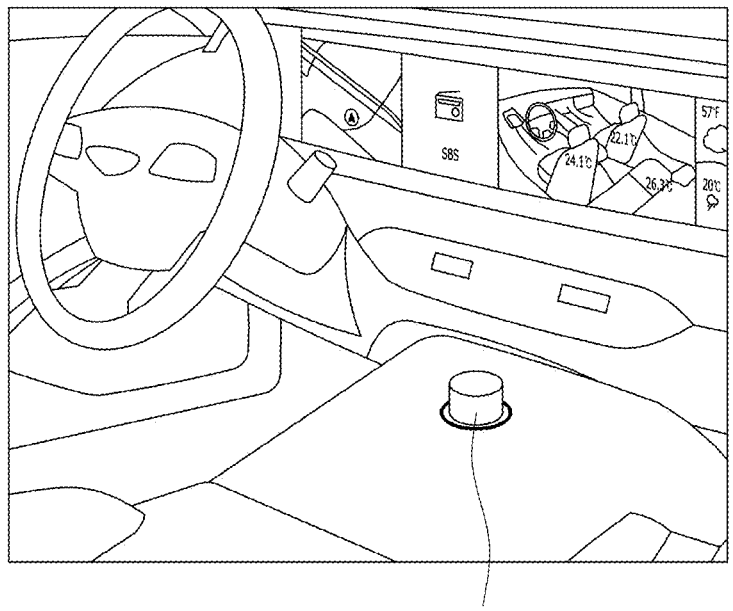
FIGS. 11A and 11B show examples of in which a plurality of detachable knobs is used according to an embodiment of the present disclosure.
Figure 11B:
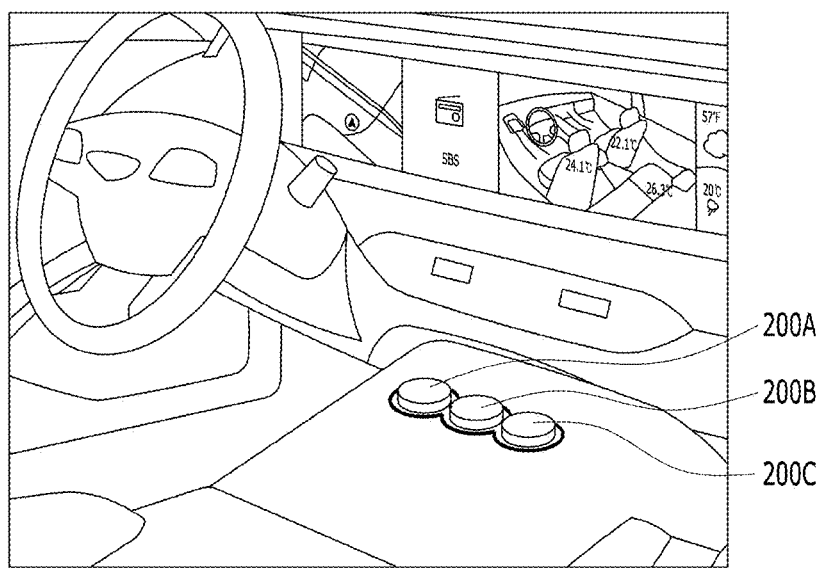

FIGS. 11A and 11B show examples in which a plurality of detachable knobs is used according to an embodiment of the present disclosure.

As shown in FIG. 11A, a plurality of detachable knobs 200A, 200B, and 200C may be stacked and attached to one attachment position. However, as shown in FIG. 11B, each of the detachable knobs 200A, 200B, and 200C may be simultaneously disposed at different attachment locations. In other words, in the state shown in FIG. 11A, a plurality of sub-functions for one function to be controlled may be controlled. Also, in the state shown in FIG. 11B, a plurality of functions to be controlled may be conveniently controlled.

In the above-described embodiment, the detachable knob 200 has been described as interlocking with the display 120 of the integrated manipulation unit 100, but the present disclosure is not limited thereto. The detachable knob 200 may be attached to the periphery of a touch panel without a display function to constitute a vehicle knob together with the touch panel.

Meanwhile, in the embodiments described so far, a driver's manipulation environment, such as a center console or a center fascia, has been mainly described. However, according to another embodiment of the present disclosure, the use of a detachable knob 200 by a passenger in a front seat or a passenger in a rear seat may also be considered. This is described with reference to FIG. 12.

Figure 12:
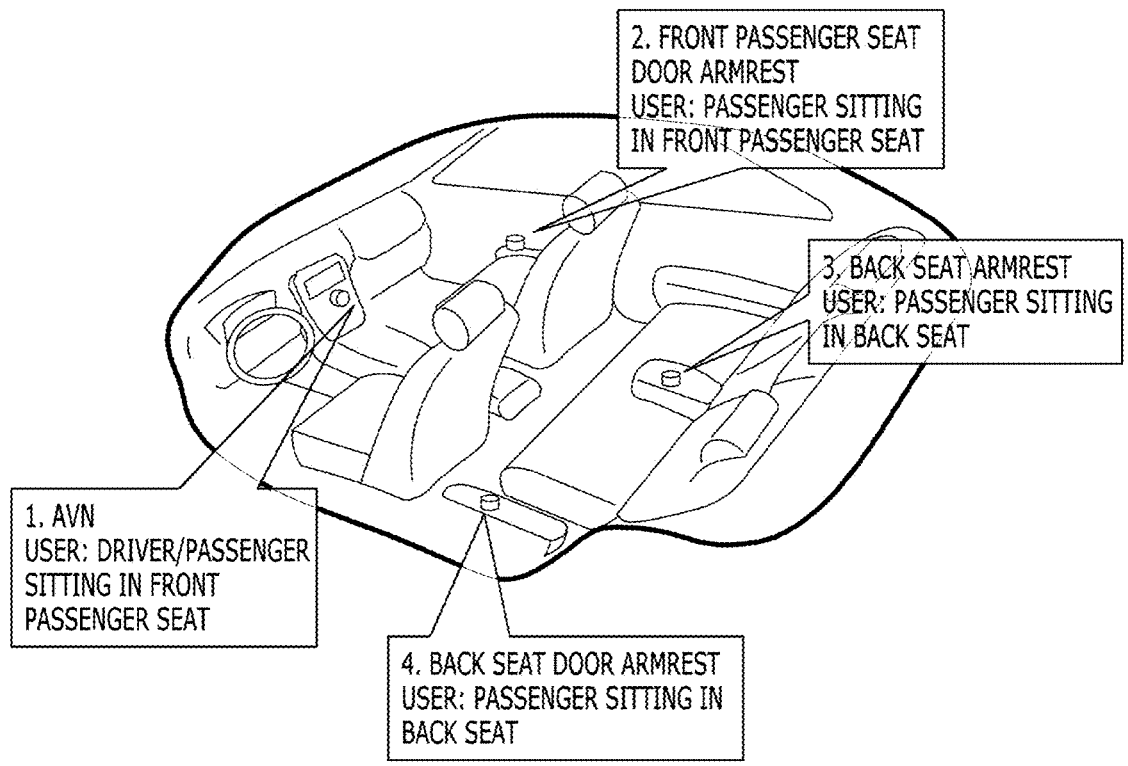
FIG. 12 shows an example of a position of an attachment unit in a vehicle according to another embodiment of the present disclosure.

FIG. 12 shows an example of a position of an attachment unit in a vehicle according to another embodiment of the present disclosure.

Referring to FIG. 12, various attachment positions are shown. First, an Audio/Video/Navigation (AVN) system periphery 1 is similar to that described with reference to FIG. 11. As other attachment positions, a front seat door armrest 2, which is assumed to be used by a passenger in the front seat, and a rear seat armrest 3 or a rear seat door armrest 4, which is assumed to be used by a passenger in the rear seat, may also be considered.

In this way, when the attachment unit is disposed at two or more different positions, each of the plurality of detachable knobs may be attached at different positions. When the attachment unit for the same detachable knob (for example, 200A) is different, the controller 160 of the integrated manipulation unit 100 may enable the function that has been last controlled in the previous attachment unit to be immediately and continuously manipulated in a new attachment unit. For example, when the detachable knob 200 that performs multimedia manipulation in the vicinity of the AVN system 1 is moved and attached to the rear seat armrest 3, the multimedia manipulation may be continued as it is.

Alternatively, the controller 160 may make a default function set for each position of the attachment unit or a function last controlled at a new attachment unit directly to be a function to be controlled, regardless of the function last controlled at the previous attachment unit.

In addition, when manipulation for the same function to be controlled is input at different positions, the corresponding function to be controlled is controlled through the detachable knob that has started the manipulation first, and the information indicating that the manipulation is restricted may be output through the display of the detachable knob that has started the manipulation later. Alternatively, different manipulation priorities may be assigned according to the position of the attachment unit rather than the manipulation order.

According to the vehicle control method using the detachable knob according to the embodiments of the present disclosure described so far, the following effects can be expected.

First, by reducing the number of switches, the design freedom of the detachable knob itself and the in-vehicle knob can be expanded and intuitive usability can be strengthened. For example, a physical key button can be simplified due to the detachable knob. As another example, a center fascia/floor console switch may be integrated due to a function integration.

In addition, since the detachable knob is detached/attached by using magnetic force, usability is increased. In other words, since magnetic force is used instead of a mechanical structure for fixing the detachable knob to an attachment area, it is convenient to attach the detachable knob only by bringing the detachable knob close to the attachment area.

In addition, by stacking a plurality of detachable knobs, a plurality of sub-function controls for one function to be controlled may be performed or different functions to be controlled may be controlled by disposing a plurality of detachable knobs at different attachment positions.

In addition, visual confirmation accompanying forward gaze deviation is unnecessary in order to check the degree of manipulation even when using through the manipulation feeling of the physical dial while driving a vehicle.

The present disclosure described above can include a processor and can be implemented as computer-readable code on a medium in which a program is recorded. The computer readable medium includes all kinds of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc.

The vehicle function control apparatus related to at least one embodiment of the present disclosure configured as described above may provide a more convenient user interface in conjunction with a detachable knob.

In addition, in the present disclosure, a function to be controlled and a user interface can be conveniently changed according to an attachment position of a detachable knob.

In particular, the present disclosure can be utilized in various ways by stacking two or more detachable knobs.

The effects obtainable in the present disclosure are not limited to the above-mentioned effects. Other effects not mentioned should be clearly understood, from the above description, by those of ordinary skill in the art to which the present disclosure belongs.

Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope thereof.

What is claimed is:

1. A control method of an integrated manipulation unit, the control method comprising:
    establishing a first data path with a first detachable knob attached to a first attachment position among at least one attachment position provided in an attachment unit;
    transmitting information on a first function to be controlled corresponding to the first attachment position to the first detachable knob through the first data path;
    establishing a second data path with a second detachable knob stacked on the first detachable knob; and
    transmitting information on a second function to be controlled corresponding to the first attachment position to the second detachable knob through the second data path.

2. The control method according to claim 1, wherein the first detachable knob includes a first dial and the second detachable knob includes a second dial.

3. The control method according to claim 2, further comprising:
    controlling the first function to be controlled in response to a first rotation amount when information on the first rotation amount of the first dial is received through the first data path; and
    controlling the second function to be controlled in response to a second rotation amount when information on the second rotation amount of the second dial is received through the second data path.

4. The control method according to claim 3, wherein the first function to be controlled and the second function to be controlled are the same as each other.

5. The control method according to claim 4, wherein a control amount for the same function to be controlled compared to a unit rotation amount is differently applied to the first rotation amount and the second rotation amount.

6. The control method according to claim 3, wherein the first function to be controlled and the second function to be controlled are different from each other.

7. The control method according to claim 1, wherein the first detachable knob and the second detachable knob include a magnetic material, and wherein the attachment unit includes an electromagnet for selectively generating attractive and repulsive forces to the magnetic material.

8. The control method of an integrated manipulation unit according to claim 7, further comprising:
    receiving information corresponding to a user's detachment intention from at least one of the first detachable knob and the second detachable knob; and
    weakening magnetic force of the electromagnet provided at the first attachment position.

9. A non-transitory computer-readable recording medium recording a program for executing the control method according to claim 1.

10. A vehicle function control apparatus comprising:
    a wireless communication unit;
    an attachment unit including at least one attachment position; and
    a controller configured to establish a first data path with a first detachable knob attached to a first attachment position among at least one attachment position provided in the attachment unit through the wireless communication unit, transmit information on a first function to be controlled corresponding to the first attachment position to the first detachable knob through the first data path, establish a second data path with a second detachable knob stacked on the first detachable knob, and transmit information on a second function to be controlled corresponding to the first attachment position to the second detachable knob through the second data path.

11. The vehicle function control apparatus according to claim 10, wherein the first detachable knob has a first dial and the second detachable knob includes a second dial.

12. The vehicle function control apparatus according to claim 11, wherein the controller controls the first function to be controlled in response to a first rotation amount when information on the first rotation amount of the first dial is received through the first data path, and wherein the controller controls the second function to be controlled in response to a second rotation amount when information on the second rotation amount of the second dial is received through the second data path.

13. The vehicle function control apparatus according to claim 12, wherein the first function to be controlled and the second function to be controlled are the same as each other.

14. The vehicle function control apparatus according to claim 13, wherein the controller controls a control amount for the same function to be controlled compared to a unit rotation amount to be differently applied to the first rotation amount and the second rotation amount.

15. The vehicle function control apparatus according to claim 13, wherein the controller controls a control amount for the same function to be controlled compared to a unit rotation amount to be equally applied to the first rotation amount and the second rotation amount.

16. The vehicle function control apparatus according to claim 15, wherein a display is disposed on an upper surface of the second detachable knob, and wherein a visual effect corresponding to the control amount for the same function to be controlled is output to one region of the display.

17. The vehicle function control apparatus according to claim 12, wherein the first function to be controlled and the second function to be controlled are different from each other.

18. The vehicle function control apparatus according to claim 17, wherein a control amount corresponding to each of the different first function to be controlled and the second function to be controlled is displayed in a form of concentric circle on an edge of the display disposed on an upper portion of the second detachable knob.

19. The vehicle function control apparatus according to claim 10, wherein the first detachable knob and the second detachable knob include a magnetic material, and wherein the attachment unit includes an electromagnet for selectively generating attractive and repulsive forces to the magnetic material.

20. The vehicle function control apparatus according to claim 19, wherein the controller weakens magnetic force of the electromagnet provided at the first attachment position when information corresponding to a user's detachment intention is received from at least one of the first detachable knob and the second detachable knob.

\* \* \* \* \*